July 20, 1926.
H. N. COPELAND
1,593,525
METHOD OF MOLDING PHENOLIC CONDENSATION PRODUCTS AND THE LIKE
Filed Oct. 5, 1925
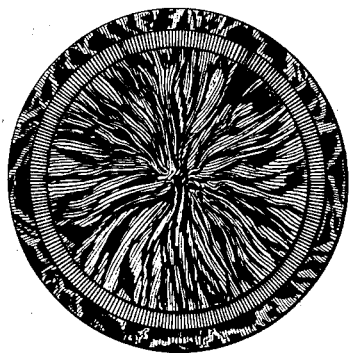
Fig. 1.
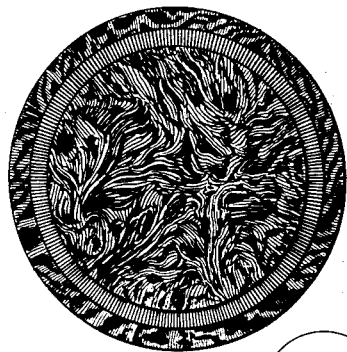
Fig. 2.
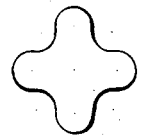
Fig. 9.
Fig. 10.
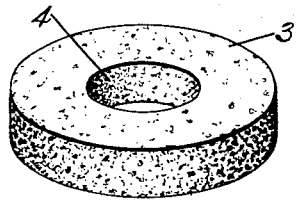
Fig. 3.
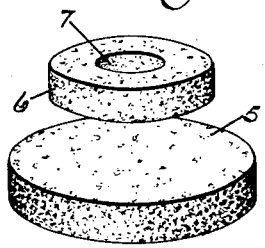
Fig. 4.
Fig. 11.
Fig. 12.
Fig. 13.
Fig. 14.
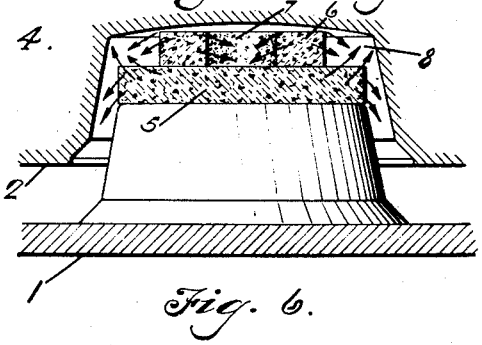
Fig. 6.
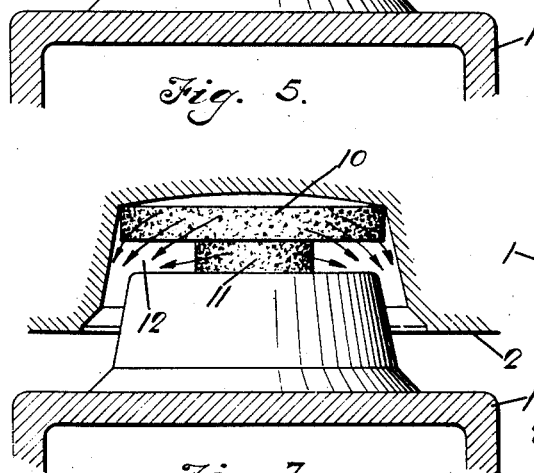
Fig. 5.
Fig. 7.
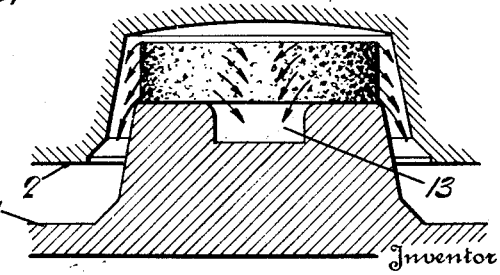
Fig. 8.
Inventor
Harry N. Copeland
By J. L. Walker
Attorney Patented July 20, 1926.

1,593,525

UNITED STATES PATENT OFFICE.

HARRY N. COPELAND, OF DAYTON, OHIO, ASSIGNOR TO THE KURZ-KASCH COMPANY, OF DAYTON, OHIO, A CORPORATION OF OHIO.

METHOD OF MOLDING PHENOLIC CONDENSATION PRODUCTS AND THE LIKE.

Application filed October 5, 1925. Serial No. 60,423.

My invention relates to the molding of phenolic condensation products and the like, and more particularly to the production in the molded product of irregular grain-like surface markings, somewhat in imitation of the irregular striate and rayonnant markings found in burly walnut, mahogany, and other fine oramental wood. Phenolic condensation material is molded in highly heated molds under heavy pressure. The usual commercial mixture of phenolic condensation products begins to fuse or becomes plastic at approximately two hundred to two hundred twenty degrees and becomes fluid at approximately two hundred and sixty to three hundred degrees. Beyond three hundred degrees, a chemical reaction takes place, and the material, which at a lower temperature became soft and then fluid, at the higher temperature sets or hardens. In the usual method of operation, after the material has been fused at a flowing temperature and caused to completely fill the mold by pressure, the temperature is increased to approximately three hundred and seventy-five degrees for a curing period, during which the molded product is hardened or set. Heretofore, it has been more or less common practice to produce articles of mottled appearance by intermixing material of different colors, prior to the introduction of material in the mold, while yet in its original granular or powder form. The intermixture of colored material in the usual process wherein the material is heated to flowing temperature under pressure and then set at a higher temperature, produces a more or less regular distribution of colored stock, giving to the product a mottled appearance.

In the present instance, it has been discovered that by preforming the material into a tablet of such shape that it will not initially fill the mold space, but will leave recesses therein, into which the material is displaced under pressure as it becomes soft, and by regulating the temperature, so that the material is displaced under pressure into such open spaces, while in a viscous or plastic condition, without becoming thoroughly liquefied, it is found that the combination of colored materials will form striæ, sometimes radiating from a central foci, and sometimes scattered and confused, giving to the distribution of the different colors a curdled appearance or burled effect, which is more or less controlled within reasonable limits by the shape and arrangement of the material within the mold.

The object of the invention is to provide a simple, efficient and effective method of producing an ornamental irregular grain design, upon phenolic condensation products somewhat in the imitation of burly effects of fine cabinet wood.

A further object of the invention is to provide an improved process for treating phenolic condensation material to produce pleasing effects by molding at lowered temperature, and with ununiform distribution of the material within the mold.

In the accompanying drawings, wherein is shown the preferred steps for carrying out the process, and illustrations of the product, Figs. 1 and 2 are top plan views of radio instrument knobs, or the like, which have been adopted for illustrative purposes, the surface delineation showing two of the endless possible effects which may be attained by the present process. Fig. 3 is a perspective view of the tablet or preformed charge of phenolic condensation material, from which is produced, substantially the effect shown in Fig. 1. Fig. 4 is a perspective view of two shapes of preformed tablets or slugs of material, which when employed together produce certain variations or modifications of the rayonnant design shown in Fig. 1. Figs. 5, 6, and 7 are sectional views of molds for forming such articles as radio instrument knobs, illustrating different forms of charge or tablet, and different distribution of the material, within the mold to produce different ornamental design effects in the surface markings of the product. Fig. 8 illustrates a modification, wherein the surface marking is varied by a modification of the die in lieu of variations of the charge or tablet. Figs. 9 to 14 are detail views, suggestive of various shapes of tablets or preformed charges of material to produce different grain or color designs or effects.

Like parts are indicated by similar characters of references throughout the several views.

While the present invention and process has been illustrated in connection with the manufacture of knobs for radio instruments, and the like, it is to be understood that this product has been adopted merely for illustrative purposes, and that the invention is not limited to the production of ornamental surface markings upon radio knobs and dials, but may be applied to various articles made from phenolic condensation products, to which it may be desired to give ornamental appearance, such as automobile steering wheels, electrical switch housings, buttons frames for pictures, or in fact any article which may be molded from phenolic condensation products.

Referring to the drawings, 1 indicates the male die and 2, the corresponding female die or matrix for the production of a radio instrument knob. These dies 1 and 2 are steam heated or heated by other means to afford the necessary fusing and curing temperatures for the material. In the present process, the material of granular form and intermixed colors, is preferably preformed into a tablet, which contains the proper charge of material, by being cold pressed, so that such tablet will maintain its shape. It has been found that by preforming the tablet or charge into annular form, as shown at 3, and subjecting such annular tablet charge within the mold to a comparatively low fusing temperature of approximately two hundred to two hundred and forty degrees a rayonnant design, in which the striæ of different colored material extend outwardly from a central foci, as in Fig. 1 is produced. The effect of the design is controlled somewhat by variations in temperature. If the temperature is normally high, to fuse the tablet to a flowing condition, the color material will be more or less evenly intermixed, and the striate design will not be present in any marked degree. However, by fusing the material at a low temperature, whereby it becomes plastic only or in a condition to flow but slowly, the increase of pressure causes it to be displaced inwardly into the central opening 4 of the annular tablet 3, and at the same time, the outer portion of such tablet is displaced outwardly and downwardly. Being in a plastic or thick viscous condition during its displacement, the color material is pulled inwardly to fill the central opening 4, and at the same time pulled outwardly to form the side and margin of the product, thereby producing radial flow lines of the different colored material, which flow lines remain visible in the finished product, affording a highly ornamental and pleasing surface, somewhat in imitation of wood graining. Various other effects can be produced by varying the shape of the tablet or charge. It has been found by experiment that by employing a solid tablet as at 5, and superposing thereon a smaller annular tablet 6, of less diameter, a different effect is produced, wherein the rayonnant design is not so decided nor extended as in Fig. 1, but in which the outer margin of the radially disposed striæ are confused and distorted to afford a somewhat intricate or tangled burled appearance, surrounding the central radii. This arrangement of the charge within the mold is illustrated in Fig. 6. The placing of the smaller annular tablet 6 upon the solid tablet 5, affords a central recess or space 7, into which the material is slowly displaced while in plastic or semi-fluid condition, and also at the exterior of the smaller annular tablet 6, and it affords an annular space 8 into which the material is displaced upwardly from the margin of the solid tablet 5 and also outwardly from the superposed smaller annular tablet 6. It is this intermixing of the material flowing in different directions, into the space 8, which affords the burled or confused striæ effect, while the inward flow or pull of the color material as it is displaced into the central opening 7, produces the central rayonnant design of lesser extent. A still further ornamental burled effect somewhat similar to that illustrated in Fig. 2 may be produced by superposing a larger tablet 10 upon a smaller tablet 11 as in Fig. 7. In this instance, the larger tablet 10 being solid throughout and devoid of the central opening before mentioned, there would be no inward displacement of the material. However, the provision of the smaller tablet 11 affords an annular space 12 into which the material of both tablets is displaced. The material of the smaller tablet 11 being displaced laterally and that of the larger tablet 10 being displaced downwardly, causes the material to be intermixed, with more or less confusion about the periphery of the mold, thereby producing an irregular design, somewhat as illustrated in Fig. 2. To produce such striate design, whether of rayonnant or burled effect, the material is fused at a somewhat lower temperature than normal, that is, two hundred to two hundred and forty dagrees, so that it flows slowly in a semi-fluid or plastic state, with the further provision of a recess into which the material is displaced while in such condition under pressure. This flow space can be variously provided, for instance, it is provided by the central orifices 4, and 7, of the annular tablet, or it may be provided by forming a marginal offset or rabbet as at 8, on the upper side of the charge, or as at 12 on the lower side of the charge. Each variation of the size, shape and position of such flow space, produces a variation of the resultant design. Moreover, with the flow space similarly positioned, the design may be varied by varying the initial fusing temperature, so that the material is flowed into such space or recess, more or less quickly and in a more or less fluid condition. In lieu of providing the flow space in the charge itself, as heretofore described, the die, either male or female may be provided with a recess 13, as shown in Fig. 8, into which the material will flow with somewhat the same effect when submitted to low fusing temperature. If such boss formed by the mold depression is not desired in the finished product, this boss may be removed subsequent to the removal of the product from the mold, leaving the surface ornamentation or design, produced by the movement of the material necessary to form such boss or process. In Figs. 9 to 14 there are shown suggestive forms or variations of the initial tablet or charge. These may be made with endless variety, and by differently positioning the charge tablet, centrally or off center or superposing tablets of different shapes one upon another, within the mold, an endless variety of designs may be produced.

Having thus described the invention, I claim:—

1. The herein described method of producing surface markings upon phenolic condensation products and the like, including distributing an intermixture of differently colored material ununiformly in the mold, fusing to a viscous state and subjecting to pressure by which the material is displaced and distributed along flow lines defined by striæ of colored material, and subjecting the molded product to a curing temperature.

2. The herein described method of producing ornamental surface markings upon phenolic condensation products and the like, including intermixing material of different colors, fusing the intermixed material to a plastic condition under pressure to effect intersecting currents of differently colored material while plastic thereby producing a striate distribution of the colored materials and subjecting the product to a curing temperature.

3. The herein described method of producing ornamental surface markings upon phenolic condensation products and the like, including intermixing differently colored materials and molding such material mixture at a comparatively low temperature under which the material is reduced to a plastic condition effecting change of position of the material within the mold thereby producing in the product flow lines of differently colored materials, and subjecting the molded product to a curing temperature.

4. The herein described method of producing ornamental surface markings upon phenolic condensation products and the like, including intermixing differently colored materials, unequally distributing the material in a mold to afford flow spaces into which the material is subsequently displaced, heating the material to a viscous condition and subjecting it to pressure to effect displacement into the flow spaces, the flow lines of such displacement being defined by striæ of differently colored material.

5. The herein described method of producing ornamental surface markings upon phenolic condensation products and the like, consisting in subjecting an intermixture of differently colored phenolic condensation materials to a comparatively low fusing temperature at which the material is rendered plastic but maintained below a free flowing state, molding such material under pressure by which the differently colored materials will be irregularly distributed in distorted masses without blending or subdividing, and thereby simulating a burly grain of cabinet wood by such combinations.

6. The herein described method of producing a rayonnant design of surface markings upon phenolic condensation material articles, consisting in arranging an intermixture of differently colored materials in annular form, within a mold whereby there is afforded within the mold a central open recess into which the material will flow, subjecting the material to fusing temperature less than sufficient to reduce the material to a free flowing condition, subjecting the fused material to pressure by which converging flow lines of differently colored material are induced by the displacement of the material into such central recess.

7. The herein described method of producing ornamental surface markings upon articles molded from phenolic condensation materials and the like, consisting in intermixing differently colored materials, distributing the material in a mold in such manner as to leave an open recess into which the material may flow when fused, fusing the material to a semi-fluid state and subjecting the fused material to pressure by which the material is displaced into the open recess, such displacement being effected along converging flow lines defined by striæ of the differently colored material.

8. The herein described method of producing ornamental surface markings upon articles molded from phenolic condensation materials and the like, consisting in intermixing differently colored materials, preforming the material into an annular tablet subjecting the tablet to fusing temperature under pressure to effect a distorted irregular distribution of the colored material.

9. The herein described method of producing ornamental surface markings upon articles molded from phenolic condensation materials and the like, consisting in intermixing differently colored materials, locating the intermixed material in a mold in such relation as to afford an annular surrounding flow space into which the material will be displaced, and subjecting the material to fusing temperature under pressure thereby causing the material to flow into the surrounding space within distorted irregular distribution of the colored material.

10. The herein described method of producing ornamental surface markings upon articles molded from phenolic condensation materials and the like, consisting in intermixing differently colored materials, arranging the intermixed material within a mold in such form as to leave an unfilled space into which the material will be displaced, subjecting the material to fusing temperature under pressure thereby displacing the material necessary to fill such space upon flow lines defined by irregular distribution of the colored material.

11. As an article of manufacture a phenolic condensation product having an ornamental striate surface marking produced by ununiform distribution of colored material somewhat in imitation of ornamental cabinet wood graining.

12. As an article of manufacture, an article molded from an intermixture of differently colored phenolic condensation materials wherein the differently colored materials are arranged in irregular radiating striæ.

13. As an article of manufacture, an article molded from an intermixture of differently colored phenolic condensation materials, wherein flow lines of differently colored material are defined by distorted striæ.

14. As an article of manufacture, an article molded from an intermixture of differently colored phenolic condensation materials, wherein the differently colored materials are irregularly distributed in imitation of burly cabinet wood graining.

15. As an article of manufacture, an article molded from an intermixture of differently colored phenolic condensation materials, having the differently colored materials arranged in irregular rayonnant design.

16. A body of intermixed phenolic condensation material of different colors preformed into an annular tablet preparatory to fusing in a heated mold.

17. A body of intermixed phenolic condensation materials of different colors preformed into tablet form preparatory to fusing in a mold.

18. The herein described method of producing surface markings upon molded phenolic condensation products and the like, including distributing and intermixture of differently colored material in a mold, in such manner as to leave open spaces into which the material may be displaced, fusing the material at a sub-normal temperature by which the material becomes mobile, but not highly fluid, subjecting the fused material to pressure by which relative movement of portions of differently colored material is affected, within the mold without blending, to produce in the molded article a series of distorted flow lines, defined by the differently colored material.

In testimony whereof, I have hereunto set my hand this 17th day of September A. D. 1925.

HARRY N. COPELAND.